United States Patent [19]

Lough

[11] Patent Number: 4,582,400
[45] Date of Patent: Apr. 15, 1986

[54] PERISCOPIC EYEPIECE FOR SMALL WEAPON TELESCOPIC NIGHT SIGHTS

[75] Inventor: Lewis E. Lough, Woodbridge, Va.

[73] Assignee: The United States of America as represented by the Secretary of the Army, Washington, D.C.

[21] Appl. No.: 632,369

[22] Filed: Jul. 19, 1984

[51] Int. Cl.⁴ ............................................. G02B 23/12
[52] U.S. Cl. .................................................. 350/538
[58] Field of Search ............... 350/538, 540, 562, 565, 350/566, 576; 33/239, 240, 245, 246, 253; 356/254, 255

[56] References Cited

U.S. PATENT DOCUMENTS

| | | | |
|---|---|---|---|
| 2,225,037 | 5/1937 | Dake | 350/562 |
| 3,509,344 | 5/1967 | Brouwer | 350/538 |
| 4,116,528 | 9/1978 | Clarke | 350/538 |

FOREIGN PATENT DOCUMENTS 2636087 2/1978 Fed. Rep. of Germany ...... 350/540

Primary Examiner—Jon W. Henry
Attorney, Agent, or Firm—Max L. Harwell; Robert P. Gibson; Anthony T. Lane

[57] ABSTRACT

A periscopic eyepiece attachment connected to a telescopic night sight mounted on a small caliber weapon to move the line-of-sight of the telescopic night sight to the line-of-sight required for the day sight (iron sights) of the weapon. The periscopic eyepiece is intended for use primarily with the much larger diameter night sights whose line-of-sight is usually 2 inches or more from the line-of-sight of the iron sights, rather than the much smaller telescopic day sights. The periscopic eyepiece attachment permits the shooter to keep his head at the same cheek weld on the weapon stock as when viewing through the iron sights, and thus maintains a natural shooter's stance when firing the weapon at night.

3 Claims, 5 Drawing Figures

PERISCOPIC EYEPIECE FOR SMALL WEAPON TELESCOPIC NIGHT SIGHTS

The invention described herein may be manufactured, used, and licensed by the U.S. Government for governmental purposes without the payment of any royalties thereon.

BACKGROUND OF THE INVENTION

1. Field of the Invention

The invention is in the field of small weapon sighting optics, and specifically to a periscopic eyepiece attachment for moving the line-of-sight of a telescopic night mounted on a small caliber weapon to the line-of-sight of the iron day sights which are always formed as integral part of the weapon for daytime use. The shooter can maintain a proper cheek weld on the weapon stock, as taught in small weapon training for achieving high accuracy of target strikes, whether firing the weapon using either the iron day sights or the night sight mounted upon the weapon.

2. Description of prior art.

Most all telescopic night sights are mounted over the receiver of small caliber weapons and above the iron sights which are used for zeroing the weapon during the day. The large diameter of the telescopic night sight's objective lens forces the shooter to raise his head to an unnatural position above his "cheek weld", i.e. above where the shooter's cheek would normally be against the weapon stock while viewing along the line-of-sight of the iron sights. The unnatural position of the shooter's head, and other human factor problems, become even more pronounced since the present telescopic night sights have increasingly larger diameter objectives to provide higher magnification.

Iron day sight placement and cheek weld formed on a particular weapon are the cumulative result of human factor considerations in the design of that weapon. It is therefore important that the shooter acquire the same natural eye position regardless of the sight being used on the weapon. The U.S. Army NA/PVS-4 starlight scope, presently being used, is one good example of the human factors problem. When this night vision scope is mounted on the U.S. Army M14 or M16 rifle, the eyepiece of the scope is about 2 1/4 inches above the line-of-sight of the iron sights. This distance prevents the shooter from maintaining the proper cheek weld and therefore adversely affects the shooter's accuracy. Most of all the day scopes are also mounted over the weapon receiver upon which the iron sights are attached. These days scopes are also a human factors problem, although not as severe as the much larger diameter objectives used with the night sights.

SUMMARY OF THE INVENTION

Increasing the state of the art in small weapon night sights requires better quality and larger diameter objective lens for providing greater ranges, but the added height is causing the severe human factors problems mentioned in the BACKGROUND above. A salient feature, or object, of the present periscopic eyepiece attachment is to further the state of the art in the long range weapon night sights by providing a more naturally positioned eyepiece for the shooter. The line-of-sight of the periscopic eyepiece moves the line-of-sight of the telescopic night sight down to the line-of-sight of the iron day sights. The shooter's eye is therefore in the same location for properly aligning and firing the weapon either by use of the telescopic night sight or with the use of the iron day sights. The size and placement of the optical elements of the periscopic eyepiece attachment may vary as required according to the size of telescopic night sight. Since some night vision scopes are inverting tubes, i.e. the real image of the target is inverted at the output of the night vision scope. The appropriate optical elements must be used accordingly within the periscopic eyepiece attachment to project the proper erect image to the shooter.

The periscopic eyepiece attachment is comprised of a periscopic eyepiece housing attached to the output of an objective lens housing and extends downward therefrom to the rear of the weapon receiver upon which the telescopic night sight may be mounted and ends with an eyepiece lens assembly in direct line with the line-of-sight of the iron sights. The shooter's eye thus assumes the proper cheek weld when viewing through the eyepiece lens assembly. The periscopic eyepiece housing contains at least an image intensifier tube, an azimuth and elevation reticle adjustment mechanism with reticle positioned at a focal plane where a real image of the object exists, appropriate optical means for focusing the image intensifier tube output at the reticle focal plane, and an eyepiece lens assembly having optics of projecting the real image at the reticle focal plane into the exit pupil of the shooter's eye.

The periscopic eyepiece housing may be mounted on the objective lens housing in a fixed position or may be rotatable where the shooter may view directly through the iron day sight even when the telescopic night sight is still mounted on the weapon. If the rotatable periscopic eyepiece housing is used, the mounting bracket upon which the telescopic night sight is mounted may include a hole through which the iron sights may be seen, or alternatively the mounting bracket may be side mounted on the weapon so as to not interfere with the iron sights.

DETAILED DESCRIPTION OF THE PREFERRED EMBODIMENTS

Figure 1:
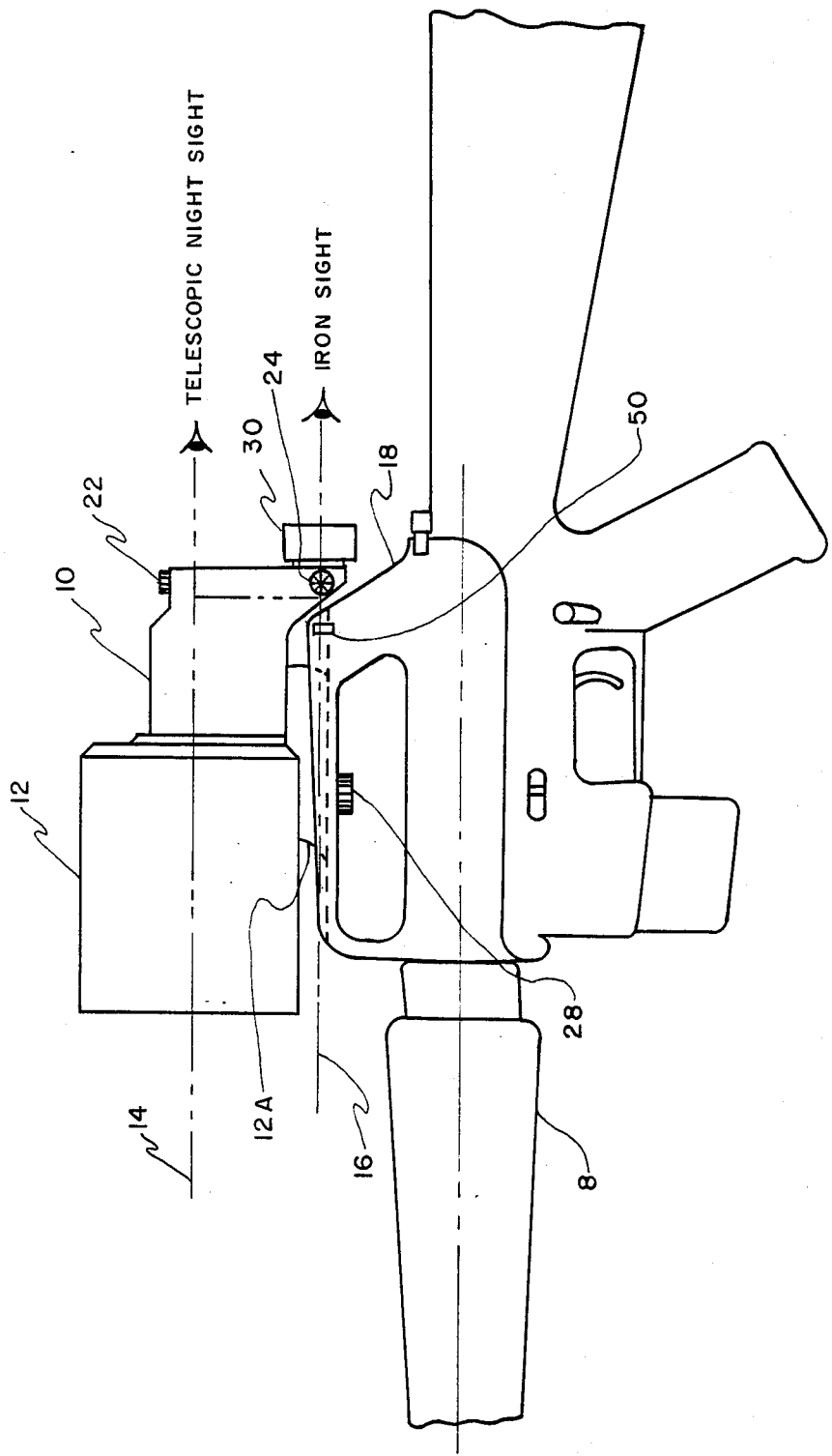
FIG. 1 illustrates a side view of a fixed position embodiment of the weapon mounted periscopic eyepiece attachment connected to a telescopic night sight.

Look now at FIG. 1 for an explanation of the fixed position periscopic eyepiece attachment. The attachment is comprised of periscopic eyepiece housing 10 and an eyepiece lens assembly 30, with appropriate optical means therein (not shown), connected to a night vision scope objective lens housing 12 having an objective lens therein (not shown). A mounting foot 12A, attached to portion of 10 and 12 at their combined center of gravity, may be screw threadable connected to weapon receiver 18. The back portion 50 of the iron sights is also attached to the receiver 18. The small caliber weapon 8 shown will be discussed as a U.S. Army M16 rifle, but is not limited thereto. The pattern of the iron sight 50 will not be elaborated on as well as the pattern of the groove down the length of receiver 18 in the boresight direction since these patterns may take many forms.

The periscopic eyepiece attachment is used to move the telescopic night sight line-of-sight 14 to the iron sight line-of-sight 16. A reticle 32 (shown in FIGS. 2 and 2A), which is positioned in the focal plane between the optical means within housing 10 and the optical means is assmebly 30, may be adjusted in elevation and azimuth for weapon zero alignment by a mechanism comprised of elevation and azimuth adjustment knobs 22 and 24 with internal adjustment screw connections (not shown) to the reticle 32.

Figure 2:
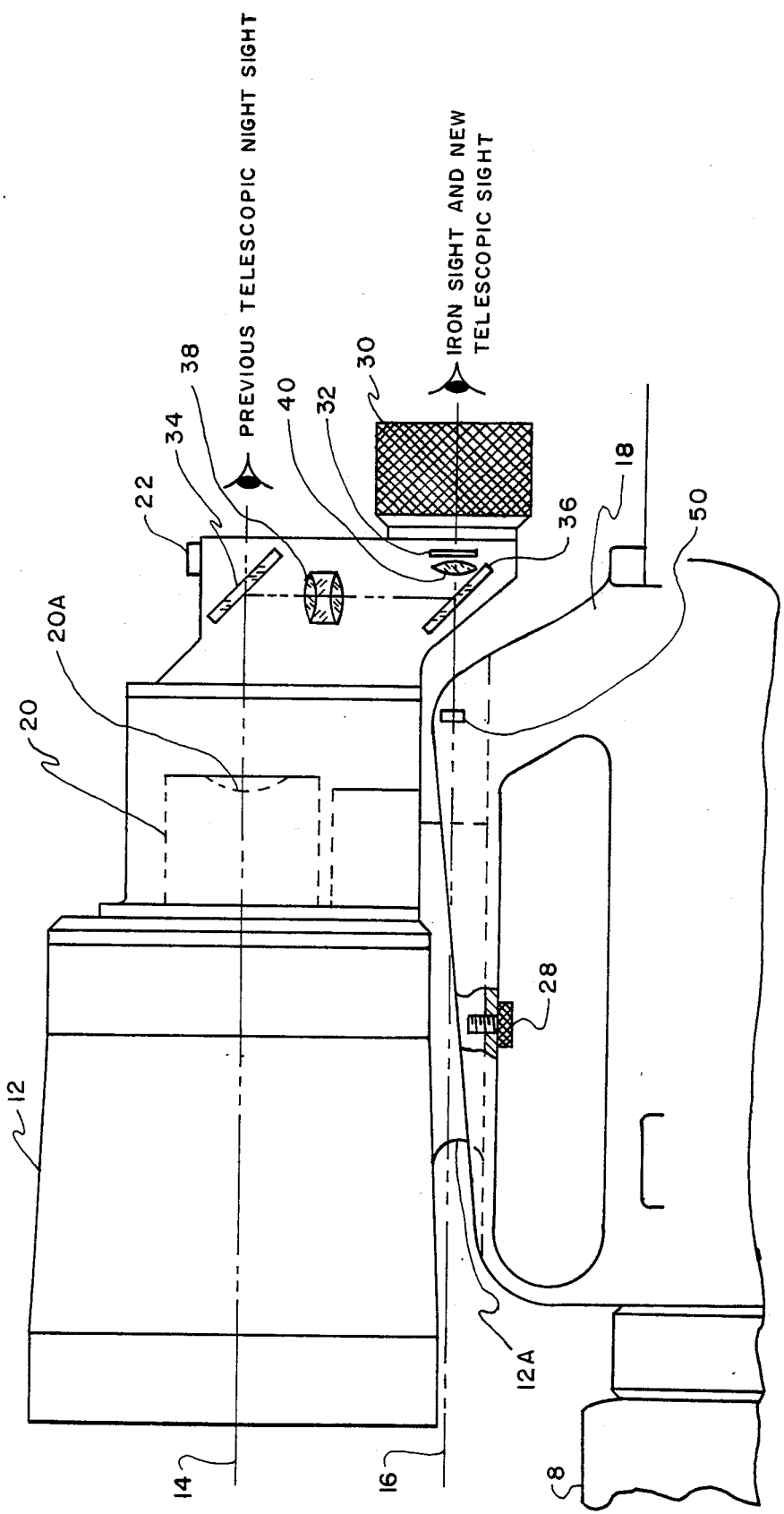
FIG. 2 illustrates an enlarged sectional view of the embodiment of FIG. 1 showing the preferred optical means within the eyepiece housing.
Figure 2A:
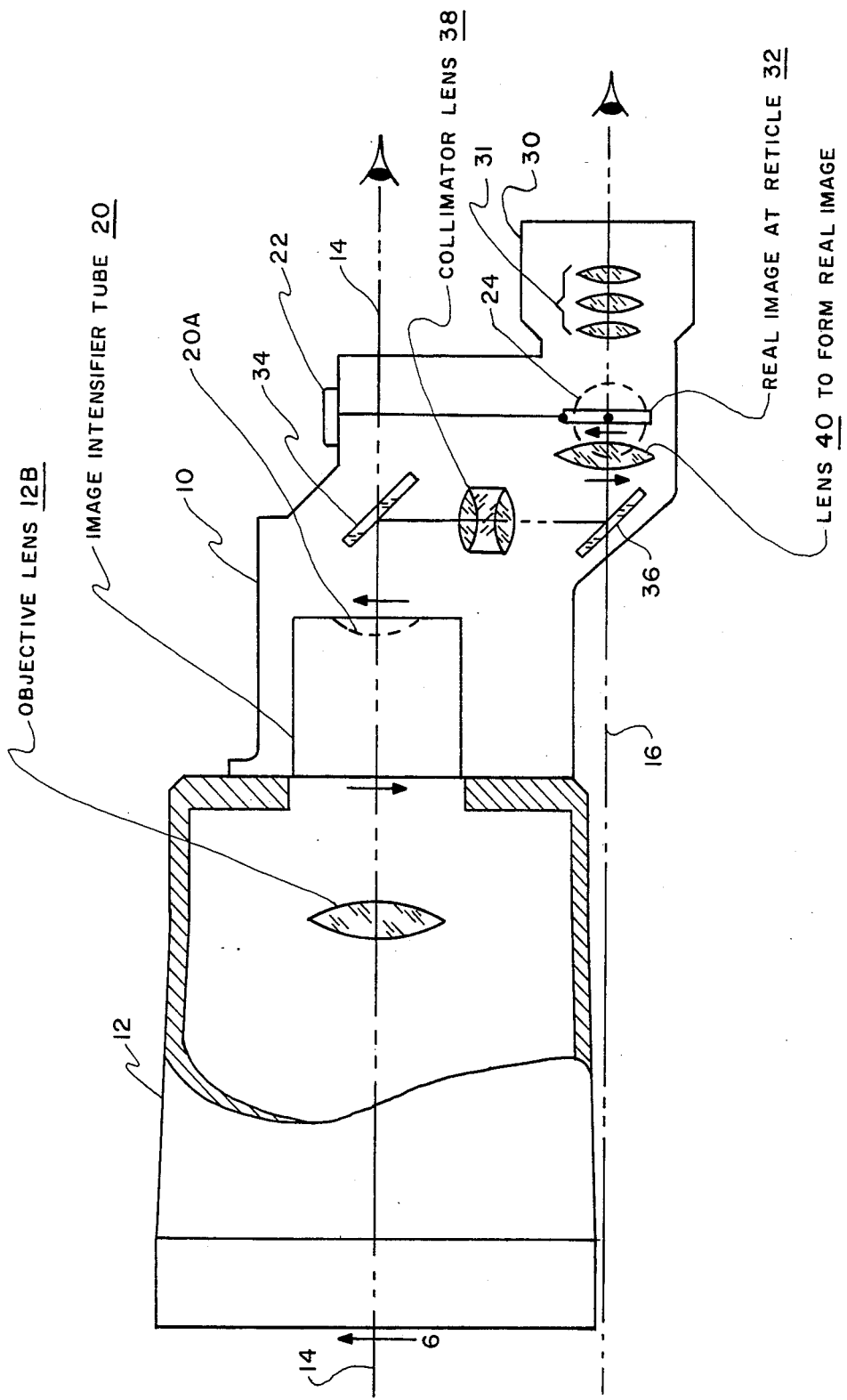
FIG. 2A shows by object arrows the trace of an object through the preferred optical means.

FIGS. 2 and 2A illustrate an enlargement of the fixed position periscopic eyepiece attachment to better show in section a preferred embodiment of the optical means. The same reference numerals are used to refer to the same elements as was in FIG. 1. The night vision image intensifier tube 20 is shown in dashed line in optical alignment with the objective lens 12B within housing 12. It will be assumed for explanation purposes of FIGS. 2 and 2A that tube 20 is an inverter tube. A targer object 6 is assumed to be in the normal erect position as shwon. The objective lens, represented as a double convex lens 12B but not limited to that type lens, inverts the object at the input to tube 20 which, in turn, reinverts back to the normal erect position at the convex output surface 20A of tube 20. The preferred optical means within housing 10 is comprised of a head plane mirror 34 and an elbow plane mirror 36 in parallel, with each mirror placed at a 45° angle with their reflecting surfaces facing each other, collimator lens 38 positioned between said mirrors 34 and 36, a double convex lens 40 which forms a real image and the reticle 32 between the elbow plane mirror 36 and the eyepiece lens assembly 30, the lens within assembly 30, shown as three double convex lens 31 but is not limited thereto. The image at the reticle 32 is an erect and real image after being inverted by lens 40, and remains erect and is focused by lens 31 of the eyepeice lens assembly 30.

Figure 4:
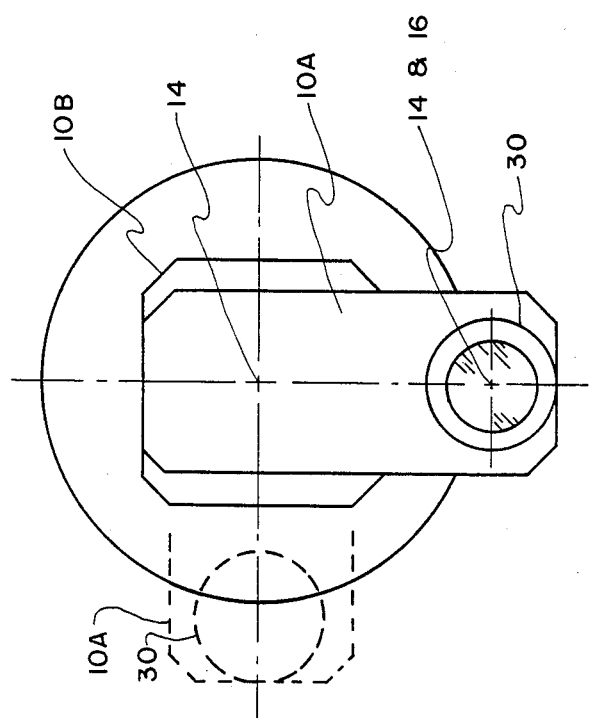
FIG. 4 shows a shooter's eye view of the rotatable periscopic eyepiece attachment in the night vision viewing mode and as rotated 90° for the day viewing mode.
Figure 3:
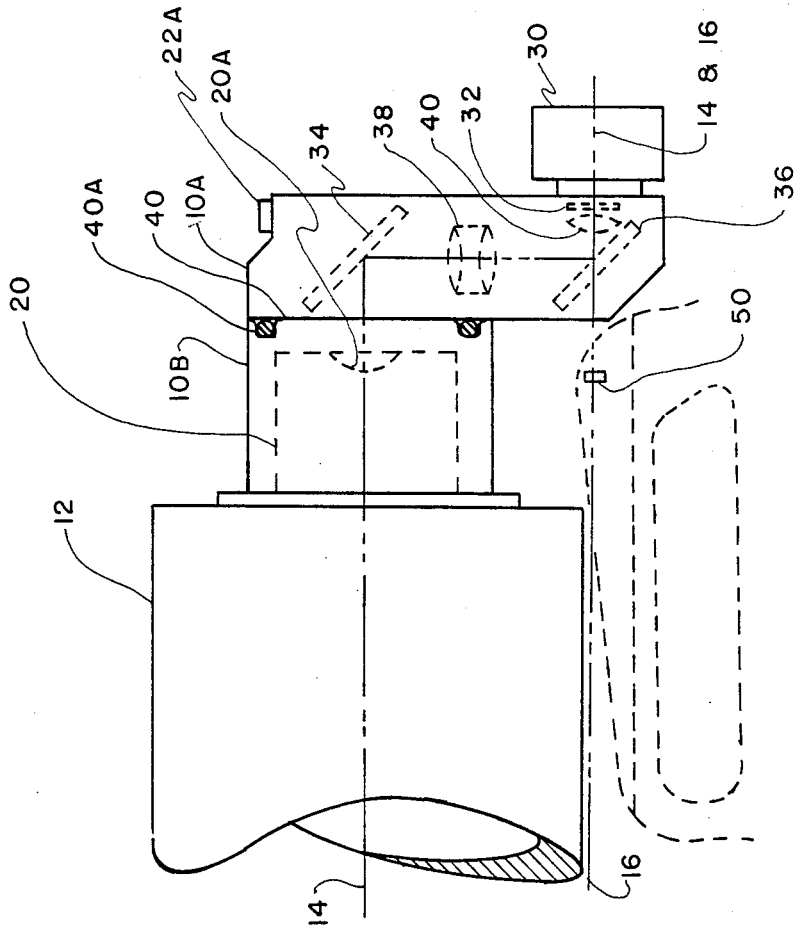
FIG. 3 illustrates a side view of a rotatable embodiment of the periscopic eyepiece attachment connected to a telescopic night sight.

FIGS. 3 and 4 illustrate a second embodiment of the periscopic eyepiece attachment. In this embodiment, the periscopic eyepiece housing is comprised of two portions, one of which is rotatable with respect to the other. These portions of the housing are represented by numeral 10B, which is a portion connected to the objective lens housing 12 and encloses the night vision image intensifier tube 20. The other portion of the housing is represented by numeral 10A and encloses the optical means, which may be identical to the optical means of the fixed position attachment. Portion 10A is rotatable about the telescopic night sight line-of-sight 14 about a swivel joint bearing surface therebetween, represented by numeral 40. Surface 40 may have indentations appropriate for friction locking the rotatable portion 10A at desired positions away from or on the iron sights line-of-sight 16. Numeral 40A represents a moisture seal to protect the optical means, such as an O-ring. This rotatable feature is very convenient for selectively using either the night sight or the iron sight while the shooter's eye remains at the natural cheek weld without removing the night sight. It should be noted that if the night vision scope is mounted in the over the receiver position that the mounting bracket footing 12A will have a hole therethrough in the boresight direction where the iron day nights will be easily seen. Alternatively, the night vision scope may be mounted by a bracket on the side of the weapon so as to be totally of the iron sight.

I claim:

1. A periscopic eyepiece attachment for connection to an objective lens housing having a telescopic night sight image intensifier tube therein which is mounted over a small caliber weapon in which the periscopic eyepiece attachment transfers the telescopic night sight line-of-sight to the line-of-sight of the weapon iron day sight formed on the weapon wherein the operator maintains the same cheek weld against the weapon stock whether the operator is firing the weapon at night using the telescopic night sight or during the daytime using the weapon iron day sight, said periscopic eyepiece attachment comprising:

a periscopic eyepiece housing attachment to said objective lens housing for interfacing the output of said image intensifier tube at an input end thereto and extending downward therefrom to the rear of the weapon receiver upon which said objective lens housing and said periscopic eyepiece housing are mounted and interfacing with an eyepiece lens assembly at an output end wherein said eyepiece lens assembly is positioned in the line-of-sight of the iron day sight formed as an integral part of said weapon, and optical means within said periscopic eyepiece housing for focuing the image intensifier tube output at a recticle focal plane in said eyepiece lens assembly in which said optical means is comprised of two parallel plane mirror wherein one of said mirrors is a head plane mirror positioned with its reflecting surface in the line-of-sight of said telescopic night sight and the other of said mirrors is an elbow plane mirror positioned at the eyepiece lens assembly along said iron day sight line-of-sight and associative corrective optical lens comprised of colliminator lens positioned between said two parallel plane mirrors and a double convex len which forms a real image of the output of said image intensifier tube which is focused on said reticle wherein said double convex lens and said reticle are positioned between said elbow plane mirror and said eyepiece lens assembly in which the line-of-sight of said telescopic night sight is moved along the line-of-sight of said iron day sight.

2. The attachment as set forth in claim 1 wherein said periscopic eyepiece housing is comprised of two portions in which one portion is fixed to said objective lens housing and encloses said image intensifier tube and a seciond portion which encloses said optical means and is rotatable about said fixed portion about a swivel joint bearing surface therebetween having indentations appropriate for friction locking said rotatable position with said eyepiece lens assembly positioned away from said iron day sight for viewing at daytime through said iron day sights or with said eyepiece lens assembly positioned along the line-of-sight of said iron day for viewing said image intensifier tube at nighttime while the operator's eye remains at the same natural cheek weld while sighting through either the telescopic night sight or the iron day sight.

3. The attachment as set forth in claim 1 wherein said periscopic eyepiece housing is in a fixed position.

* * * * *